United States Patent
Cuervo

(10) Patent No.: US 7,096,198 B1
(45) Date of Patent: Aug. 22, 2006

(54) INTERNET WEB SITE PROGRAM FOR THE PURCHASE, ISSUE AND DISPENSING OF DEBIT CARDS

(76) Inventor: Vincent Cuervo, 1545 Miller Rd., Coral Gables, FL (US) 33146-2309

( * ) Notice: Subject to any disclaimer, the term of this patent is extended or adjusted under 35 U.S.C. 154(b) by 1310 days.

(21) Appl. No.: 09/207,854

(22) Filed: Dec. 8, 1998

Related U.S. Application Data

(63) Continuation-in-part of application No. 09/128,088, filed on Aug. 3, 1998, now Pat. No. 6,105,009, which is a continuation-in-part of application No. 08/877,006, filed on Jun. 16, 1997, now abandoned.

(51) Int. Cl.
*G06Q 40/00* (2006.01)

(52) U.S. Cl. .............................. 705/39; 705/35; 705/43; 235/375; 235/379

(58) Field of Classification Search ................ 705/35, 705/43, 38, 42, 41, 16, 17, 39, 44, 23, 413, 705/37; 235/375–381; 221/7
See application file for complete search history.

(56) References Cited

U.S. PATENT DOCUMENTS

| 5,883,810 A * | 3/1999 | Franklin et al. ............ 235/380 |
| 6,000,832 A * | 12/1999 | Franklin et al. ............ 235/380 |
| 6,014,645 A * | 1/2000 | Cunningham ................ 705/38 |

FOREIGN PATENT DOCUMENTS

| WO | WO 9826376 | * | 6/1998 |
| WO | 98 4402 A2 | * | 3/2000 |

OTHER PUBLICATIONS

Unknown. Unbanked Debit? Card Fax, vol. 1998, No. 81, p. 2, Apr. 1998.*

Unknown. Internet Access: Consumers & Businesses Can Now Order the Industry's Most Comprehensive Package of Communications Services on tth 'Net. EDGE, on & about AT&T, Oct. 1995.*

AT&T Targets Women with IVillage Net Access Pact. Newsbytes News Network, Nov. 1998.*

Unknown. A new Card Dispenser Gives the Unbanked a Debit Option. Debit Card News, vol. 3, No. 21, p. 7, Apr. 1998.*

Unknown. RSL Com: RSL CoOM sells virtual phone cards. M2 Presswire, Nov. 1998.*

About the Card. See the Omnigift Web site, retrived from the Internet on Mar. 13, 2000.*

Apr. 1998.*

* cited by examiner

*Primary Examiner*—Vincent Millin
*Assistant Examiner*—Kelly Campen
(74) *Attorney, Agent, or Firm*—John H. Faro

(57) ABSTRACT

A computerized computer program in an Internet Web site with input and output capabilities for the sale, issue and dispensing of debit cards that includes automated teller machine as dispensers for debit cards that include each one a unique identification number on a storage member thereon. A purchaser clicks the Web site address through his or her personal computer, then, following the program steps, enters his/her particulars and those of the transaction which are merged with one of the unique identification numbers and transmitted to a remote computer facility that acts as clearing house for the users' transactions. The remote facility includes input and output means to communicate with the debit card issuer(s), the dispensers and the associated circuitry to obtain the identification numbers of the debit cards being issued and dispensed and the particulars of the holders and the transactions. Adequate software is provided in the remote facility to permit holders to access the same line of credit opened for one or more debit cards so that different users can remotely access and affect one or more lines of credit.

10 Claims, 1 Drawing Sheet

INTERNET WEB SITE PROGRAM FOR THE PURCHASE, ISSUE AND DISPENSING OF DEBIT CARDS

The present application is a continuation-in-part of (now allowed) U.S. patent application Ser. No. 09/128,088 filed on Aug. 3, 1998, U.S. Pat. No. 6,105,009, which in turn is a continuation-in-part of abandoned application Ser. No. 08/877,006 filed on Jun. 16, 1997, which are hereby incorporated by reference.

BACKGROUND OF THE INVENTION

1. Field of the Invention

The present invention relates to a computerized program for the purchase of debit cards through the facilities of a programmed Internet Web site which provides the sale, issue and dispensing of debit cards 2. Description of the Related Art Applicant believes that there is not a closest reference. The present invention differs from present systems and ways of soliciting and purchasing of debit and other types of bank cards. Through the use of cyberspace and Internet, subscribers will apply for a debit card with any select line of credit that can be used with more than one card to transfer funds and other incentives. The debit card will be issued by a participating bank or financial institution and can be dispensed by an Automated Teller Machine, or received directly at the participating issuing bank office, or mailed, if so desired by purchaser.

Other ways of applying for and purchasing of a debit card provide for a number of more or less complicated features that fail to solve the problem of obtaining a debit card in an efficient and economical way. None of those suggest the novel features of the present invention.

SUMMARY OF THE INVENTION

It is one of the main objects of the present invention to provide a system for purchasing, issuing, dispensing and controlling debit cards that require a minimum of paperwork, maintenance and financial disclosure from a card purchaser.

It is another object of this invention to provide a system that permits to solicit and acquire such debit cards from present online cyberspace facilities in a Web site of the Internet.

It is another objet of this invention to allow the subscriber the choice of receiving the debit card, purchased through the Internet, using electronic funds transfers from the bank savings or checking accounts, or from any of his or her existing bank cards to an issuing participating bank, and if desired may be dispensed from widely available automated teller machines.

It is yet another object of this invention to permit a subscriber to obtain one or more than one credit card associated with the same identifying serial number for accepting deposits and withdrawals to readily effect transfers of funds to remote locations, including foreign countries.

It is yet another object of this invention to provide such a device that is inexpensive to maintain while retaining its effectiveness.

Further objects of the invention will be brought out in the following part of the specification, wherein the detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawing in which.

DETAILED DESCRIPTION OF THE PREFERRED EMBODIMENT

Figure 1:
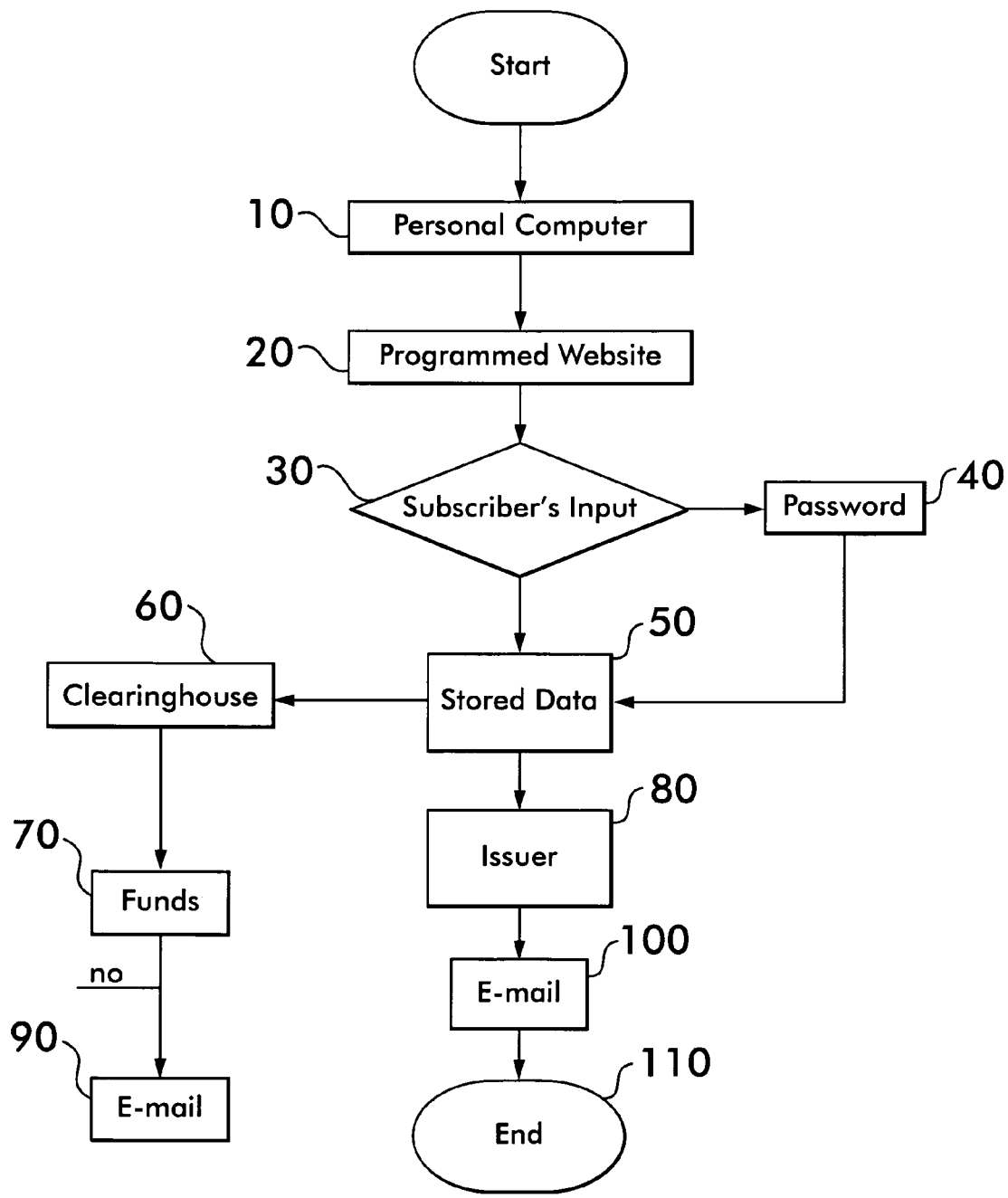
FIG. 1 represents a block diagram of the system and method used in the preferred embodiments for the present invention.

Referring now to the drawing, where the present invention is generally referred to with numeral 10, it can be observed that it basically includes a personal computer that facilitates the access to the programmed Internet Web site 20. A subscriber 30, through his/her Internet provider through will enter the Web site and then display the program. The program provides to the subscriber the steps to follow. For the purposes of this application a subscriber will be deemed a debit card purchaser or holder. The purchaser is requested to enter a secret password 40, not to exceed 7 digits or letters or the combination of both. The purchaser's password his or her zip code number and the address of the nearest and convenient location to him or her of an automated teller machine for future purposes. With this information the subscriber also enters the information of the select line of credit amount requested 50.

The system determines the amount of information it will require, or make optional, leaving latitude for the purchaser as to how much information he or she wants to disclose. The more information he or she discloses the more secure the debit card will be.

The next step pertains to providing the information to the clearinghouse 60. Entering information about the transaction, such as amount of the line of credit, the amount to be withdrawn/transferred and the mode of payment, (charging to his/her bank checking or savings account, or charges to a bank card,) by entering the digits of the account, the name and address of the financial institution. The transfer of funds transaction from the purchaser's bank account, or from credit, debit or other bank cards is referred to clearinghouse 60 that will determine whether the request of funds to be transferred are available. At this point the subscriber may receive an e-mail 90, notifying that the application was declined and explaining the reason. Credit is verified in a conventional manner by contacting clearinghouse which in turn connects with issuer (not shown) in a conventional manner.

The funds from the purchaser will be transferred to the debit card to the issuer 80, an issuer will be the entity issuing the debit cards, with all the information and instructions 70. The program advised the purchaser that there will be at least a 24 hours waiting period before the debit card is issued and dispensed at the closest convenient available automated teller machine location to purchaser, or at the issuing bank or the financial institution of his or her preference, or by mail if the purchaser desires to receive the debit card this way. The subscriber will receive an e-mail 100 advising of the debit card(s) approval for issue and dispense, with instructions to retrieve the debit card by entering his or her password 40 at the nearest previously selected automated teller machine, or at the offices of the issuing bank, or it will be mailed, if the purchaser so desires 110.

If, the debit card purchased is approved, and more than a card is then requested and dispensed, then the serial numbers will be linked to each other with the software making them look as if they were only one number. In this manner, a card purchaser may give one or more cards to others (child in college, traveling salesperson, etc.), who will be able to use the debit card within the available line of credit. The card purchaser can then replenish the line of credit for the others remote usage, thus effectively constituting an instantaneous transfer of funds.

The particulars of the purchaser and the transaction, as well as the serial number(s) of the debit card(s) being issued and dispensed, are assembled in a predetermined manner and forwarded to the clearinghouse 60.

Computerized clearinghouse 60 includes computer assembly with associated storage assembly, and telecommunications circuitry for sending and receiving data through network. Program instructions and data are stored in storage assembly to permit the issuer to keep track of the debit card serial numbers of each of the debit cards dispensed, as well as the line of credit issued to each card depending on the funds transferred by a card purchaser.

Additionally, the storage assembly may include instructions to provide incentives to the card holders, such as the payment of interest for said line of credit balances. The software will permit receiving/disbursement of funds from and to any holder of the linked debit cards, with or without additional security conditions that will be stored in storage assembly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In an interactive system for the consummation of a transaction resulting in the issuance of debit card, wherein said interactive system comprises means for entry of subscriber information relative to identification of said subscriber, and designation of a source of funds from which to apply value to said debit card, wherein the improvement comprises:
   (a) An internet accessible portal, hosted by an issuer of a debit card, having issuer designated fields for supply of subscriber information, relative to identification of said subscriber, and issuer designated fields for subscriber designation of a source of funds, to be used to fund said debit card;
   (b) Means for issuer communication from said internet accessible portal to an electronically accessible portal or address, from which said designated funds are available to be withdrawn, so as to permit verification of availability for transfer of available funds to said issuer of said debit card for further credit to said subscriber;
   (c) Means for issuer initiated transfer of said subscriber designated source of available funds to said issuer, to the extent requested by said subscriber, to said issuer to fund said debit card; and
   (d) Means for issuance of said debit card to said subscriber, in a national currency designated by said subscriber, to the extent of said funds transferred to said issuer, from said subscriber designated source of available funds.

2. The improved system of claim 1, wherein said issuer accessible internet portal permits said subscriber to designate more than one source of funds to fund said debit card.

3. The improved system of claim 1, wherein said issuer accessible internet portal permits said subscriber to designate someone, other than, or in addition to, said subscriber to receive said debit card.

4. The improved system of claim 1, wherein said means for issuance of said debit card include (a) issuer assignment of a subscriber identifier, and (b) communication of said identifier to said subscriber along with the location of a terminal, or an issuer agent, from which said subscriber can obtain and/or activate said debit card.

5. The improved system of claim 4, wherein said debit card is forwarded to said subscriber for activation on said terminal, or by said issuer agent, designated by said issuer.

6. The improved system of claim 4, wherein said debit card is issued to said subscriber from a participating financial institution, acting as an agent for said issuer, for activation on a terminal designated by said issuer or said financial institution.

7. The improved system of claim 4, wherein said debit card is forwarded to said subscriber for activation on a terminal designated by said issuer.

8. The improved system of claim 7, wherein upon depletion of available funds from said debit card, said debit card is replenished with funds from said terminal designated by said issuer and/or by said issuer agent.

9. The improved system of claim 1, wherein said issuer accessible internet portal permits said subscriber to designate the national currency in which the debit card is to be funded.

10. The improved system of claim 9, wherein said national currency, in which said debit card is to be funded by said subscriber, is either the same or different the national currency from said designated source of available funds used to fund said debit card.

* * * * *